Figure 1:
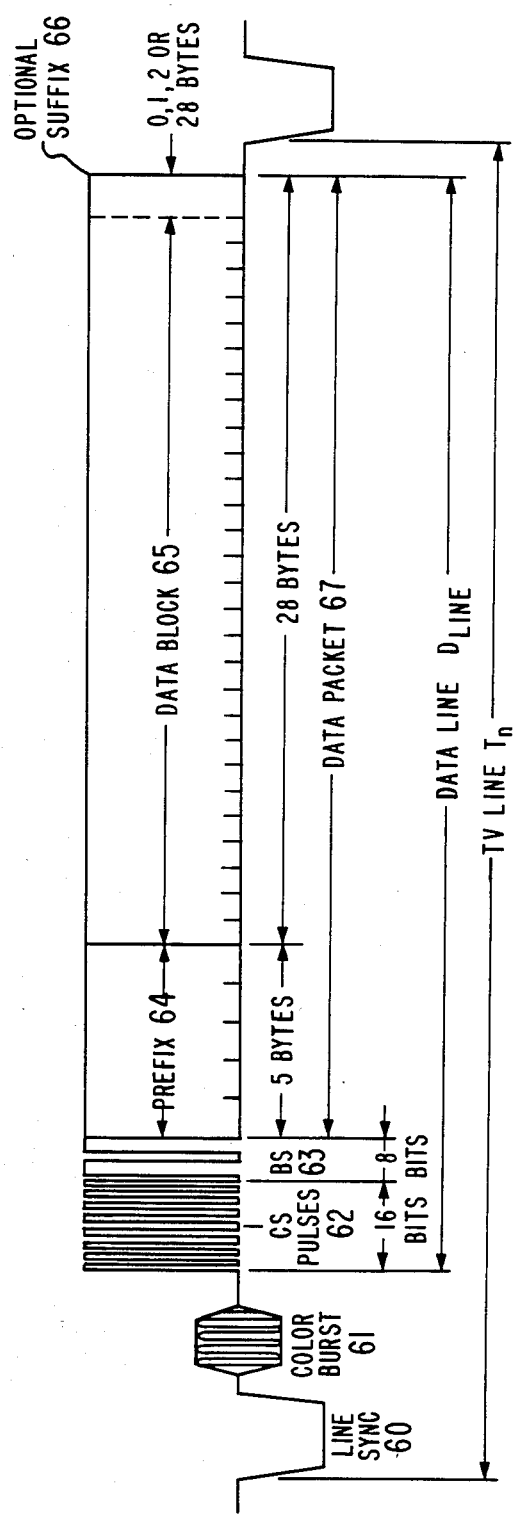

United States Patent [19]

Gurumurthy

[11] Patent Number: 4,626,913
[45] Date of Patent: Dec. 2, 1986

[54] CHROMA BURST DERIVED CLOCK REGENERATOR FOR TELETEXT DECODER

[75] Inventor: Kadagattor V. Gurumurthy, Marion County, Ind.

[73] Assignee: RCA Corporation, Princeton, N.J.

[21] Appl. No.: 624,822

[22] Filed: Jun. 26, 1984

[51] Int. Cl.[4] .......................... H04N 7/087; H04N 9/45
[52] U.S. Cl. .................................... 358/147; 358/142; 358/19; 370/120
[58] Field of Search ................. 358/142, 146, 147, 15, 358/19, 148; 370/118, 119, 120

[56] References Cited

U.S. PATENT DOCUMENTS

| | | | |
|---|---|---|---|
| 4,288,809 | 9/1981 | Yabe | 358/147 |
| 4,313,134 | 1/1982 | Rustman et al. | 369/32 |
| 4,422,176 | 12/1983 | Summers | 375/120 |

OTHER PUBLICATIONS

An application note that appears in a publication entitled, "Integrated Circuit Databook", dated Oct., 1983, published by Plessey Solid State, Irvine, California 92714.

A data sheet for a teletext video processor SAA5030 produced by Mullard Co., dated Jun., 1981.

An article entitled, "Teletext Decoder" that appears in a publication entitled, LSI Circuits for Teletext and Viewdata, The Lucy Generation, pp. 15-20, dated Jun., 1981, published by Mullard Limited, London, England.

A data sheet for videotext data slicer and clock regenerator SL9100EXP published by Plessey Semiconductors, Ltd.

Primary Examiner—James J. Groody
Assistant Examiner—Michael D. Parker
Attorney, Agent, or Firm—Eugene M. Whitacre; Joseph J. Laks; Sammy S. Henig

[57] ABSTRACT

A color reference signal produced by a color oscillator is coupled to a frequency converter that generates a signal having a frequency that is a multiple of that of the color reference signal. The phase of the frequency converter output signal is adjusted in accordance with the phase of the clock synchronization sequence pulses of a teletext data line signal to produce a regenerated clock. Edges of the regenerated clock define the times in which corresponding bits of the teletext data line contain valid digital information.

10 Claims, 2 Drawing Figures

CHROMA BURST DERIVED CLOCK REGENERATOR FOR TELETEXT DECODER

Teletext is a general term for a television-based communication technique. In teletext communication, a television line signal is utilized for broadcasting textual and graphical information encoded in digital binary representation. Teletext may be sent during the vertical blanking interval when no other picture information is sent. The teletext binary information includes control and display digital information serially organized in data blocks. The organization of the binary information in the broadcasted signal is determined by the standard employed by the broadcaster. By way of an example only, references are made here to the NABTS (North American Basic Teletext Specification).

After its reception by the television receiver, the teletext data, included in a television line signal, is processed by the teletext decoder. The digital data is extracted from the television line signal by a data slicer providing a stream of data bits. Additionally, a regenerated clock is derived from the television line signal to provide timing reference for further processing the stream of extracted data bits.

Both the stream of data bits and the regenerated clock are supplied to a data processor that is sometimes referred to as the prefix processor. The prefix processor may be made to receive user-initiated commands specifying the desired information for display. The prefix processor buffers in memory the data contained in the teletext channel selected for displaying. The buffered data is processed and provided to a display processor which outputs displaying signals derived from the buffered data for display in a television picture tube.

Each television line in NABTS teletext television signal, for example, includes a line synchronization pulse followed by a color burst signal and a sequence of data line bits called a data line. Each data line begins with a sequence of alternate "1"'s and "0"'s that defines the clock synchronization sequence. These clock synchronization sequence pulses are followed by the framing code and the data packe bits.

In some circuits of the prior art, a high Q ringing circuit is used to regenerate the regenerated clock from edges of the clock synchronization sequence pulses. Such an approach requires the tuning of a tuned circuit. A disadvantage of such circuits is that, in the face of changes of circuit parameters, such circuits experience performance degradation. Additionally, when only the vertical blanking interval is utilized for teletext data transmission, the synchronizing clock pulses are not available during a great part of the television field time; consequently, the regenerated clock may experience a phase drift during the period outside the vertical blanking interval.

In NABTS teletext signal, the ratio between the frequencies of the color burst and the clock synchronization sequence pulses is constant. Likewise, the color burst waveform is in synchronism with the clock synchronization sequence pulses.

In carrying out the invention, the burst signal in a television line of a teletext-like signal is utilized to produce the regenerated clock. The frequency of the regenerated clock is related to the frequency of the clock synchronization sequence pulses. The regenerated clock defines the times in which the sliced teletext data bits contain valid digital information. In carrying out the invention, the regenerated clock has, for example, the same frequency as that of the clock synchronization sequence pulses.

Also, in carrying out the invention, a television line containing the color burst signal provides synchronization to the regenerated clock even when such television line does not contain teletext information. This feature enables to improve the immunity to noise in the system, because the effect of noise may be averaged over many cycles of the color burst signal. In some circuits of the prior art, the noise is averaged over a short period of time in each field time. This is so because when teletext information is provided only in the vertical blanking interval, the number of television lines carrying clock synchronization information is substantially small.

The incoming television signal may propogate through different routes before its reception by the television receiver. Reflection routes along the propogation path, for example, may cause a path dependent phase shift. The resulting time delay of the incoming television signal caused by such phase shift is also frequency dependent. Because the frequencies of the color burst and the clock synchronization sequence pulses are different, this time delay may vary according to the properties of the transmission medium through which the incoming television signal propogates. Therefore, it may be desirable to adjust the phase of the regenerated clock to correspond with the phase of the clock synchronization sequence pulses.

Accordingly, in carrying out the invention, the phase of the regenerated clock is adjusted to conform to the phase of data line bits provided by the data slicer. Thus, the relative delay time between the regenerated clock and that of the clock synchronization sequence pulses, for example, becomes less dependent on the properties of the transmission medium through which the incoming television signal propogates.

The output signal of a built-in color oscillator that resides in most present day color television receivers may be used for producing a free running clock. The free running clock is further utilized to produce the regenerated clock having, for example, the same frequency as that of the clock synchronization sequence pulses. In NABTS teletext, the ratio between the frequency of the clock synchronization sequence pulses and that of the chroma burst signal is 8/5. Thus, producing the regenerated clock frequency from the output signal of the color oscillator is simplified.

In accordance with the invention, a clock regeneration apparatus, in a teletext decoder, produces from an incoming teletext-like television signal a regenerated clock. A line of the teletext-like television signal includes a burst signal and a data line signal that includes data line information bits. The regenerated clock provides timing reference information to recover the data line information bits of the data line signal. The apparatus includes a source of said teletext-like television signal. The burst signal within the teletext-like television signal is used for generating a first clock having a frequency that is related in frequency to the frequency of said burst signal. The first clock is used for producing the regenerated clock.

Figure 2:
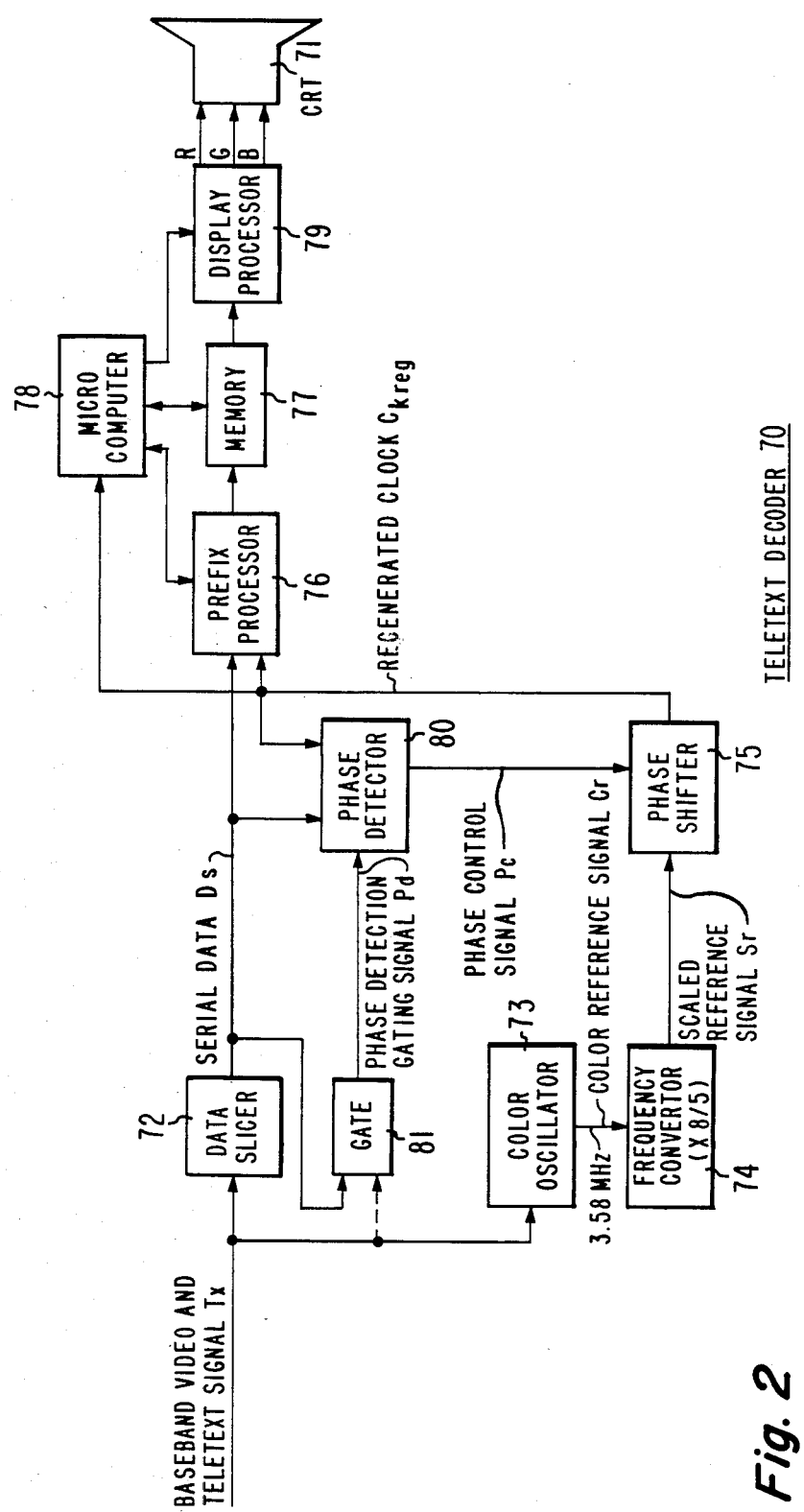

FIG. 1 illustrates a television line Tn of an NABTS defined, baseband teletext signal Tx; and FIG. 2 illustrates a block diagram of a teletext decoder 70, embodying the invention, for processing teletext signal Tx.

In FIG. 1, illustrating a television line Tn of an NABTS defined baseband teletext signal Tx, a line sync pulse 60 that provides horizontal line synchronization information is followed by a color burst signal 61 having the color subcarrier frequency of 3.579 MHz. Clock synchronization sequence pulses 62 follow color burst signal 61. A byte synchronization sequence 63 that follows clock synchronization sequence pulse 62 constitutes the framing code and is used as a reference for byte synchronization. The following bits organized as prefix 64, data block 65 and optional suffix 66, constitute a data packet 67. Clock synchronization sequence pulses 62, byte synchronization sequence 63 and data packet 67 constitute a data line signal $D_{LINE}$.

FIG. 2 illustrates a block diagram of a teletext decoder 70 that receives baseband video and teletext signal Tx such as of FIG. 1, and supplies R, G and B signals for display in a cathode ray tube 71. The source of baseband video and teletext signal Tx, not shown, may be a conventional output terminal of the video detector of a conventional color television receiver. Such video detector may receive the IF stages output signals for video detection.

Teletext decoder 70 of FIG. 2 includes a conventionally built data slicer 72 that produces serial data Ds of data line signal $D_{line}$. It may include an analog threshold detector that generates a binary data "1" only when signal $D_{line}$ exceeds a predetermined voltage; otherwise it produces a binary data "0". Serial data Ds are coupled to a prefix processor 76, as described later on.

A color oscillator 73 generates a color reference signal Cr, illustratively of a frequency $f_{sc}$ that equals 3.579 MHz, from color burst signal 61 of FIG. 1. Color reference signal Cr of FIG. 2 may be the same color reference signal of a conventional NTSC television receiver, and may be generated similarly. In one example it may include a phase-locked loop that is synchronized by color burst signal 61.

Color reference signal Cr is coupled to a conventionally built frequency converter 74. Frequency converter 74 may include conventional phase locked loop circuits generating a scaled reference signal Sr having a frequency $f_{sr}$ that equals $8/5 \times f_{sc}$. Scaled reference signal Sr is coupled to prefix processor 76 through a controlled phase shifter 75, as described later on, that produces a regenerated clock $C_{kreg}$.

Conventionally built prefix processor 76 receives serial data Ds and utilizes regenerated clock $C_{kreg}$ for clocking in serial data Ds. Prefix processor 76 stores the digital information of serial data Ds in a memory 77. A microcomputer 78 processes the stored digital information in a known manner and stores derived pixel words from it in, for example, a different section of memory 77.

A conventionally constructed display processor 79 converts in a known manner each pixel word to R, G and B signals that provide display information to be displayed in cathode ray tube 71.

In accordance with an aspect of the invention, a phase detector 80 receives serial data Ds and regenerated clock $C_{kreg}$ and produces a phase control signal Pc that is indicative of the phase difference between regenerated clock $C_{kreg}$ and of serial data Ds. Phase detector 80, of conventional design, receives a phase detection gating signal Pd. Gating signal Pd is indicative, for example, of the periods in which clock synchronization sequence pulses 62 byte of FIG. 1 are provided. Phase difference detection is performed only during the 16-bit time of clock synchronization sequence pulses 62. It should be understood, however, that phase difference detection may be accomplished successfully in other portions of television line Tn of FIG. 1.

A gating circuit 81 of FIG. 2 produces gating signal Pd that is coupled to phase detector 80. Gating circuit 81 receives serial data Ds for producing phase detection gating signal Pd. Alternatively, as indicated by the broken lines coupling to gating circuit 81, line synchronization pulse 60 of FIG. 1 may be used for extracting gating signal Pd. This may be accomplished by using a one-shot triggered flip-flop that is triggered by the trailing edge of pulse 60.

Phase control signal Pc of FIG. 2 may, for example, increase when the phase difference is positive, decrease, when it is negative and remain constant when clock synchronization sequence pulses 62 of FIG. 1 and regenerated clock $C_{kreg}$ of FIG. 2 are in phase.

Phase control signal Pc is coupled to phase shifter 75 to control the degree of phase shift operated on scaled reference signal Sr for producing regenerated clock $C_{kreg}$ having the same phase, for example, as clock synchronization sequence pulses 62 of FIG. 1. Thus, the feedback network that includes phase shifter 75 and phase detector 80 produces regenerated clock $C_{kreg}$ having the same frequency as that of scaled reference signal Sr and having a predetermined phase relationship with, for example, clock synchronization sequence pulses 62. It should be understood that by coupling regenerated clock $C_{kreg}$ through a delay line to prefix processor 76, not shown in FIG. 2, it is possible to obtain other desired phase relationships between regenerated clock $C_{kreg}$ of FIG. 2 and the data bits of data line $D_{LINE}$ of FIG. 1.

What is claimed is:

1. A clock regeneration apparatus, in a teletext decoder, for producing from an incoming teletext-like television signal a regenerated clock, wherein a line of said teletext-like television signal includes a burst signal and a data line signal that includes data line information bits containing a clock synchronization sequence and wherein said regenerated clock provides timing reference information to recover the data line information bits of said data line signal, said apparatus comprising:
   a source of said teletext-like television signal;
   means responsive to said burst signal within said teletext-like television signal for generating in accordance therewith a first clock having a frequency and a phase that are related to the frequency and phase of said burst signal, respectively;
   a phase shifter responsive to a control signal for generating said regenerated clock signal by varying the phase of said first clock, in accordance with said control signal; and
   a phase detector responsive to said teletext-like television signal and to said regenerated clock for detecting a phase difference to generate said control signal in accordance with said phase difference.

2. The clock regeneration apparatus as recited in claim 1, wherein said phase shifter is responsive to phase information derived from said data line signal for shifting the phase of said regenerated clock relative to said first clock.

3. The clock regeneration apparatus as recited in claim 2, wherein said data line signal includes clock synchronization sequence pulses that provide said phase information and wherein aaid phase shifter is responsive to the phase of only said clock synchronization sequence pulses from said data line signal for shifting the phase of said first clock.

4. The clock regeneration apparatus as recited in claim 1, wherein said first clock generating means comprises, a color oscillator that produces a color reference signal.

5. The clock regeneration apparatus as recited in claim 1, wherein said first clock generating means comprises, a color oscillator responsive to said burst signal for producing therefrom a second clock signal, and a frequency converter means responsive to said second clock signal for generating therefrom said first clock.

6. The clock regeneration apparatus as recited in claim 1, wherein said phase detector is responsive to said teletext-like television signal for producing said control signal that is indicative of the phase relationship between said data line bits from said teletext-like television signal and said regenerated clock.

7. The clock regeneration apparatus as recited in claim 1, wherein the frequency of said first clock is a rational multiple of the frequency of said burst signal.

8. The clock regeneration apparatus as recited in claim 7, wherein said rational multiple equals 8/5.

9. An apparatus according to claim 1 further comprising means responsive to said teletext-like television signal for generating a second control signal when said clock synchronization sequence occurs and wherein said phase detector is responsive to said second control signal for detecting said phase difference only when said clock synchronization sequence occurs.

10. An apparatus according to claim 9 wherein said second control signal generating means is responsive to a horizontal sync signal of said teletext-like television signal for generating in accordance therewith said second control signal.

* * * * *